United States Patent
Hellmeier et al.

[11] Patent Number: 6,148,721
[45] Date of Patent: Nov. 21, 2000

[54] APPARATUS FOR DECORATING ARTICLES USING SUCTION CONVEYOR

[75] Inventors: Joachim Hellmeier, Rödinghausen; Volker Steffen, Herford, both of Germany

[73] Assignee: Werner Kammann Maschinenfabrik GmbH, Bunde, Germany

[21] Appl. No.: 09/236,050

[22] Filed: Jan. 22, 1999

[30] Foreign Application Priority Data

Jan. 30, 1998 [DE] Germany .................... 198 03 617

[51] Int. Cl.[7] .......... B41F 17/00; B65G 17/46; B65G 47/04; B65G 47/84; B65H 1/00
[52] U.S. Cl. .......... 101/35; 101/37; 198/471.1; 414/226.01; 414/752.01
[58] Field of Search ................ 101/35–37, 41, 101/44, 177, 217; 198/471.1, 803.5, 689.1; 414/222.01, 223.01, 225.01, 749.1, 222.13, 226.01, 751.1, 752.1

[56] References Cited

U.S. PATENT DOCUMENTS

| | | | |
|---|---|---|---|
| Re. 24,961 | 4/1961 | Curtis | 118/316 |
| 3,232,414 | 2/1966 | Bringham et al. | 198/34 |
| 4,509,429 | 4/1985 | de Broqueville | 104/25 |
| 5,092,239 | 3/1992 | Bubley | 101/115 |
| 5,097,935 | 3/1992 | Weiss | 198/345.3 |
| 5,165,340 | 11/1992 | Karyln et al. | 101/126 |
| 5,520,107 | 5/1996 | Airoldi | 101/35 |
| 5,542,768 | 8/1996 | Rother et al. | 400/120.16 |
| 6,000,329 | 12/1999 | Averill | 101/35 |

FOREIGN PATENT DOCUMENTS

| | | |
|---|---|---|
| 0 089 543 | 3/1983 | European Pat. Off. . |
| 0 581 378 | 2/1994 | European Pat. Off. . |
| 32 24 330 | 1/1984 | Germany . |
| 89 13 408 U | 12/1989 | Germany . |
| 5-318700 | 12/1993 | Japan . |
| 1032546 | 3/1983 | United Kingdom . |

*Primary Examiner*—Kimberly Asher
*Attorney, Agent, or Firm*—Seidel, Gonda, Lavorgna & Monaco, PC

[57] ABSTRACT

An apparatus for decorating articles has at least one article carrier which is movable along a transport path through treatment stations and which is connected to a vacuum source at least over a portion of the transport path for holding an article in the article carrier by the vacuum. A stationary vacuum duct is arranged along at least a portion of the transport path, to make a connection between the vacuum source and the article carrier. At least one vacuum conduit in the article carrier is connected to the vacuum duct by way of a connecting conduit which is connected to the vacuum conduit in the article carrier and which is moved along the transport path. The vacuum duct is provided with an opening for the passage of the vacuum to the connecting conduit, the opening being movable along the vacuum duct.

15 Claims, 7 Drawing Sheets

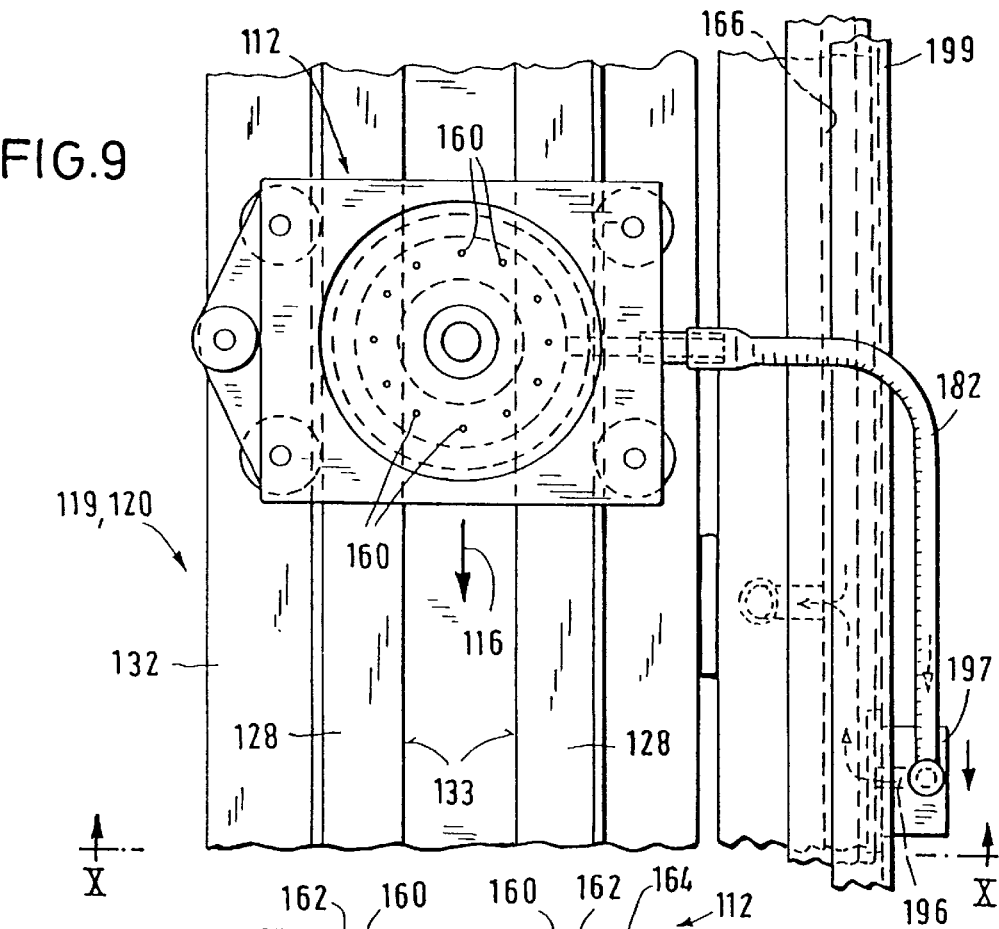
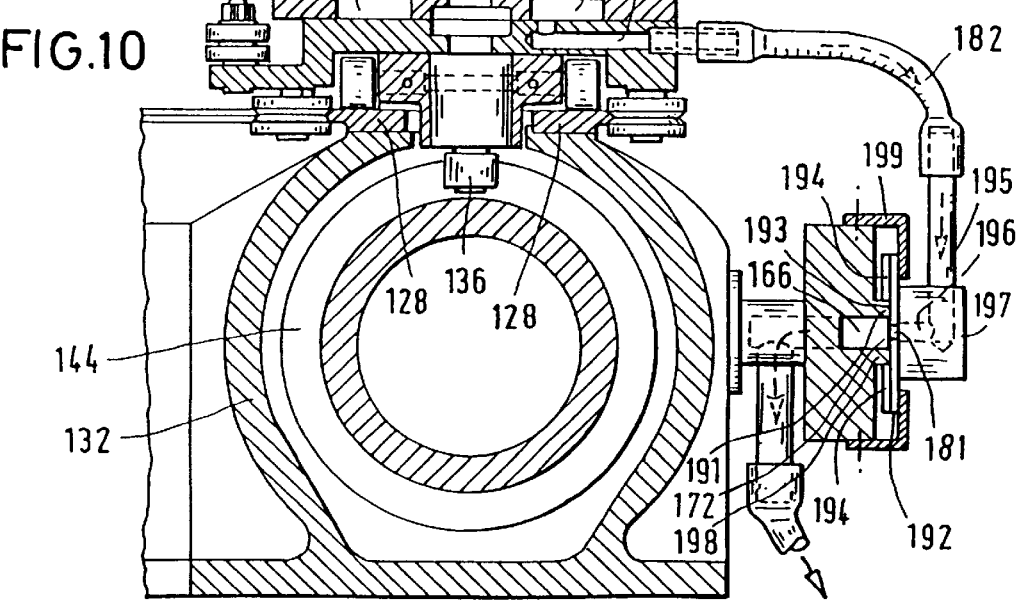

APPARATUS FOR DECORATING ARTICLES USING SUCTION CONVEYOR

FIELD OF THE INVENTION

The invention concerns an apparatus for decorating articles which are transported along a transport path to implement the decoration procedure.

BACKGROUND OF THE INVENTION

In a procedure for decorating an article such as applying printing thereto as for example by means of offset printing, in which the article is moved on an article carrier along a transport path through one or more treatment stations, in many cases there is a need for the article which is carried by the article carrier to be fixed in a given position in the article carrier accommodating the article, during the transportation phase and also during the decoration phase which, as indicated, may for example include applying printing to the article as by means of offset printing. That is the case in particular when a plurality of printing operations are implemented in succession and the individual partial images which go together to constitute the definitive image have to be oriented in relation to each other in a given manner in order thereby to achieve a good print quality. Frequently in that respect the procedure adopted is such that, after the article has been received by the article carrier, the article is initially subjected to an alignment operation therein to put it into the correct orientation. In the case for example of CDs, that can be effected by a bar or mandrel being passed through the central hole in the CD and bringing it into a given position relative to the article carrier and thus relative to the treatment stations, that given position then being subsequently maintained in the course of further transportation movement and during the following treatment operations, by means of a reduced pressure which is caused to act on the article such as the CD. Hereinafter that reduced pressure can be referred to generally as a 'vacuum' although it will be noted that the reduced pressure will normally be not more than between 0.2 and 0.3 bar below the ambient air pressure.

As the article carriers in which the vacuum must be operative to hold the respective articles in the correct position therein move with respect to the frame structure of the machine or apparatus and as the vacuum has to be transmitted from the frame structure of the machine or apparatus to the moving article carriers, this requirement generally entails the adoption of complicated design configurations which are also susceptible to wear, as it is necessary, at at least one location in the apparatus, to afford a connection, which enjoys sealing integrity at least to some extent, as between a stationary vacuum duct or conduit, for example in or on the frame structure of the machine or apparatus, and a vacuum conduit in the moving article carrier. As apparatuses for applying decoration or printing to articles are generally provided with a plurality of article carriers in order to achieve a high level of production output, it will be appreciated that supplying the vacuum to the article carriers is in every way a source of considerable complication in the machine. As an example in this respect attention may be directed to U.S. Pat. No. 5,165,340. In the machine described and illustrated therein, the article receiving means are disposed on a rotating table coaxially with the axis of rotation, so that the articles are moved along a circular path of movement.

In the case of apparatuses involving a path of article movement which is of a configuration that differs from a circular path, the feed of vacuum to the individual article carriers is even more complicated, if not entirely impossible. That applies for example to the apparatus known from EP 0 581 378 A1 for decorating an article, having at least one article carrier for carrying the article, which is movable along a linear transport path between a station in which the article is received by the article carrier and a station in which the decorated article is removed from the article carrier. In that apparatus, orientation of the article carrier in the appropriate position is effected by a centering roller which runs in a guide, while orientation of the article in the appropriate position is additionally implemented by a bar which is passed through the central hole in the article which is in the form of a CD. Those arrangements for orienting and fixing the article to which printing is to be applied are not sufficient to achieve the quality of print image that is required nowadays. In addition, the impression cylinder for applying printing to the article has to be provided with a special recess into which the projecting bar engages during the printing operation.

SUMMARY OF THE INVENTION

An object of the present invention is to provide an apparatus for decorating articles, which is so designed as to at least substantially obviate shortcomings of the above-discussed apparatuses.

Another object of the present invention is to provide apparatus for decorating articles, such that the application of the reduced pressure to individual article carriers is possible in a relatively simple manner even if the apparatus has a very large number of article carriers.

Yet another object of the present invention is to provide an apparatus for applying decoration such as printing to articles, which can ensure that articles are securely held in respective article carriers that are movable along a transport path in the course of a decoration procedure.

Still a further object of the present invention is to provide an apparatus for decorating articles, which permits the articles during transportation thereof to be firmly held on respective article carriers, involving simple apparatus structure which can be located in the apparatus at a readily accessible location.

In accordance with the principles of the present invention the foregoing and other objects are achieved by an apparatus for decorating an article, having at least one article carrier for the article, which is movable along a transport path between a station in which the article is received by the article carrier and a station in which the decorated article is removed from the article carrier. The article carrier is adapted to be connected to a vacuum source at least over a portion of the transport path. A stationary vacuum duct is arranged along at least a portion of the transport path and at least one vacuum conduit is provided in the article carrier and is adapted to be connected to the vacuum duct by way of a connecting conduit which is connected to the vacuum conduit in the article carrier and which is adapted to move along the transport path. The stationary vacuum duct is provided with an aperture for the vacuum therein to pass through the aperture to the connecting conduit. The aperture into the stationary vacuum duct is movable along the vacuum duct.

As will be noted in greater detail from preferred embodiments of the invention which will be described hereinafter, as the communication between the stationary vacuum duct and the individual article carrier or carriers is made by way of connecting conduits which can be connected on the outside to the respective article carrier, it is possible for the vacuum duct which can be common to a plurality of article carriers to be disposed at a location in the apparatus, at which it is readily accessible from the exterior. In general, the region beneath the transport path for the article carriers presents itself for that purpose, as the station or stations for decorating articles passing through the apparatus and for possibly performing another treatment or treatments on the articles are all disposed above the transport path, along which the article carriers are moved.

In that respect, there is also the possibility, if necessary, for the stationary vacuum duct to be disposed at a certain distance from the transport path or the article carriers movable therealong, as it is then only necessary for the connecting conduits to be of a suitably dimensioned length. A particular advantage of the apparatus in accordance with the invention however is that it permits a high degree of flexibility in terms of the configuration of the transport path and the manner in which it extends. It will be noted therefore that the practical realisation of the present invention is not linked to the provision of a circular transport path. On the contrary, the transport path may be linear, elliptical, oval or of some other configuration in the form of a closed path. In that respect, the stationary vacuum duct can also readily extend in a configuration corresponding to the layout of the transport path for the article carriers and the articles carried thereby, for example the stationary vacuum duct can also be linear or curved or in the form of an endless duct or of some other configuration.

In accordance with a preferred feature of the invention, the wall of the vacuum duct is not continuous along the periphery thereof, but is in the nature of a channel having an open side which is closed by at least one flexible closure element or wall portion which extends along the longitudinal extent of the stationary vacuum duct. In such an arrangement, the vacuum duct may have two mutually oppositely disposed edge strip portions which are in the form of respective closure elements and which, in a non-loaded condition, are pressed against each other with a resilient prestressing force and thus close the vacuum duct. Due to the vacuum, the two edge strip portions of the vacuum duct, which bear against each other in their closed position, are pressed against each other by the external air pressure, in addition to being urged towards the closed position by virtue of the effect of the resilient prestressing force. Preferably, the two edge strip portions comprise rubber strips which are resiliently urged towards each other in the above-described manner.

In accordance with a preferred feature of the invention, the connecting conduits for each of the individual article carriers are in the form of or are provided with narrow sliding shoes in the general shape in plan of a small boat configuration or a loom shuttle, with the longitudinal extent thereof extending substantially parallel to the direction of transportation movement of the respective article carrier along the transport path of the apparatus. The sliding shoes engage between the two edge strip portions of the stationary vacuum duct, whereby the two edge strip portions are urged away from each other against their resilient prestressing force. However, that effect of the edge strip portions of the vacuum duct being urged apart is limited to the region in which the sliding shoe is disposed. The sliding shoe converges in a more or less pointed configuration at its front and rear ends. Therefore, at the two regions of the stationary vacuum duct, which adjoin the respective sliding shoe at the front and at the rear thereof, the vacuum duct remains closed by the edge strip portions bearing against each other so that air is very substantially prevented from passing into the vacuum duct, from the ambient atmosphere.

Further objects, features and advantages of the invention will be apparent from the following description of two preferred embodiments of the invention.

BRIEF DESCRIPTION OF THE DRAWING

FIG. 9 is a view corresponding to FIG. 5 of a second embodiment, and FIG. 10 is a view in section taken along line X—X in FIG. 9.

DESCRIPTION OF PREFERRED EMBODIMENTS

Figure 1:
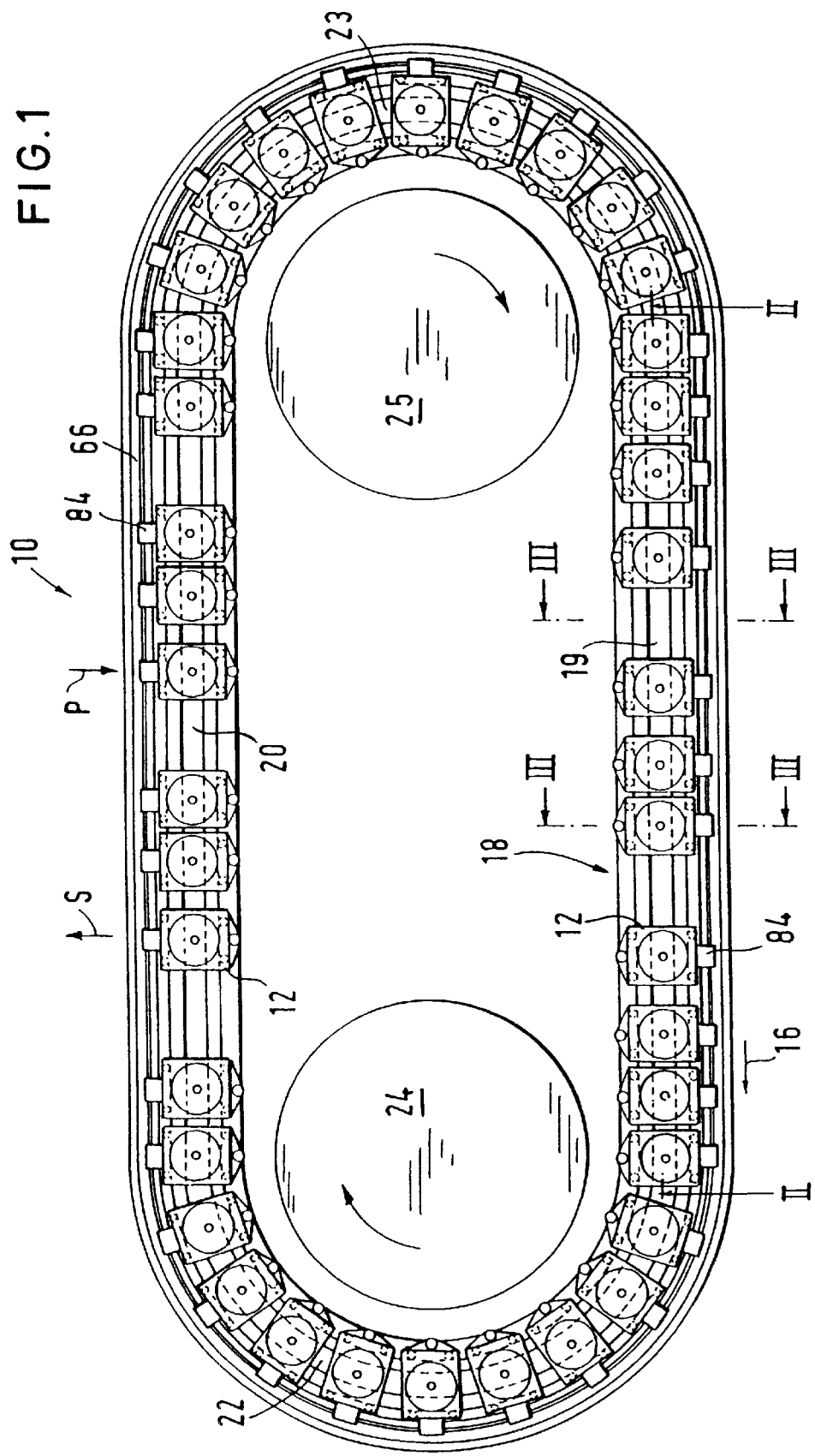
FIG. 1 is a diagrammatic plan view of an apparatus according to the invention for decorating articles in the form of CDs.

Referring firstly to FIGS. 1 through 8, reference numeral 10 therein generally denotes an apparatus in the form of a printing machine for decorating articles in the form of CDs by applying printing thereto. The apparatus 10 has a plurality of article carriers 12 which are each in the form of a respective carriage and which are each provided on their top side with a holder as shown at 14 for example in FIG. 3. The holder 14 has a receiving means as indicated at 15 for example in FIGS. 3 and 5 for the CD to be printed upon. The article carriers are successively moved in the direction of arrow 16 indicated in FIG. 1 along a transport path 18 which extends around the apparatus and which has first and second linear portions 19 and 20 disposed at a horizontal spacing from each other, and first and second approximately semi-circular portions 22 and 23 respectively which interconnect the two linear portions 19 and 20. Associated with each of the linear portions 19 and 20 of the transport path indicated at 18 is a transport screw 26, seen in FIG. 2, which provides for transportation of the article carriers 12 in the direction indicated by the arrow 16, in each of the linear portions 19 and 20. Associated with each of the two arcuate portions 22 and 23 of the transport path 18 is a respective transport wheel 24 and 25 which rotates in a horizontal plane and which, in the embodiment illustrated, rotates continuously.

Figure 3:
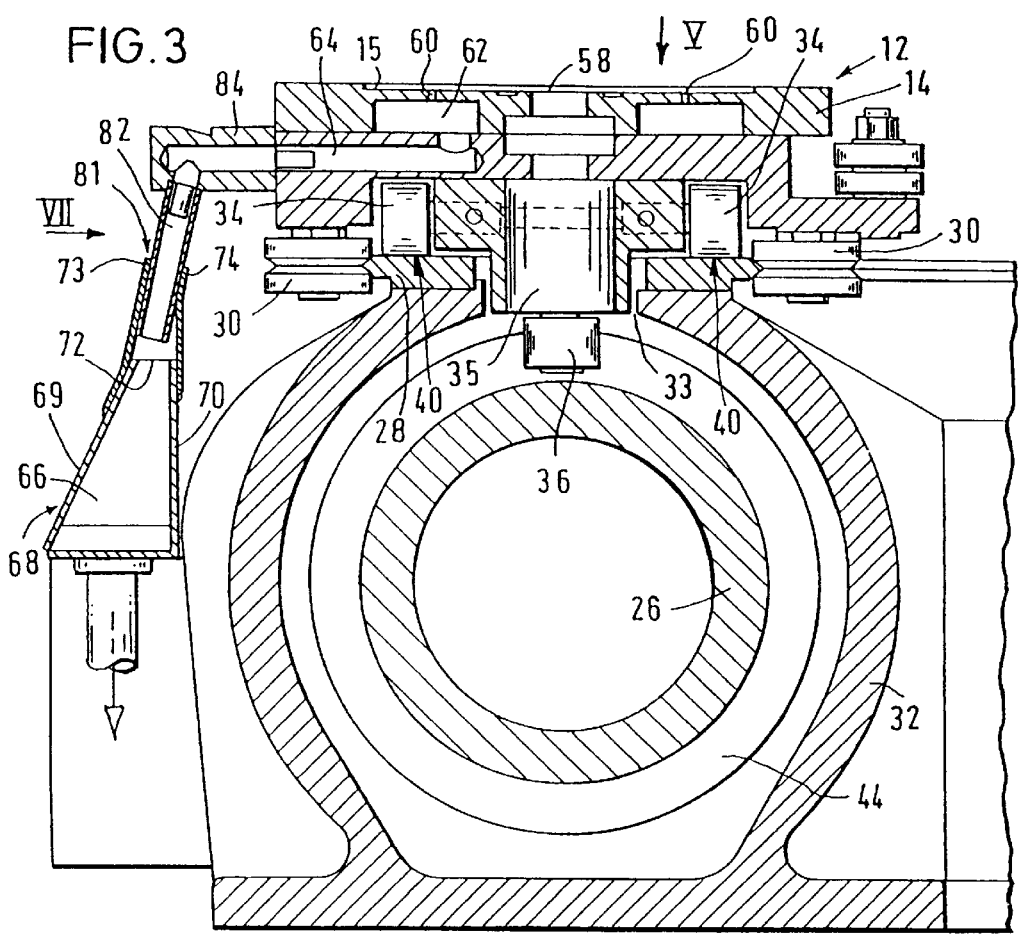
FIG. 3 is a view in section taken along line III—III in FIG. 1.
Figure 4:
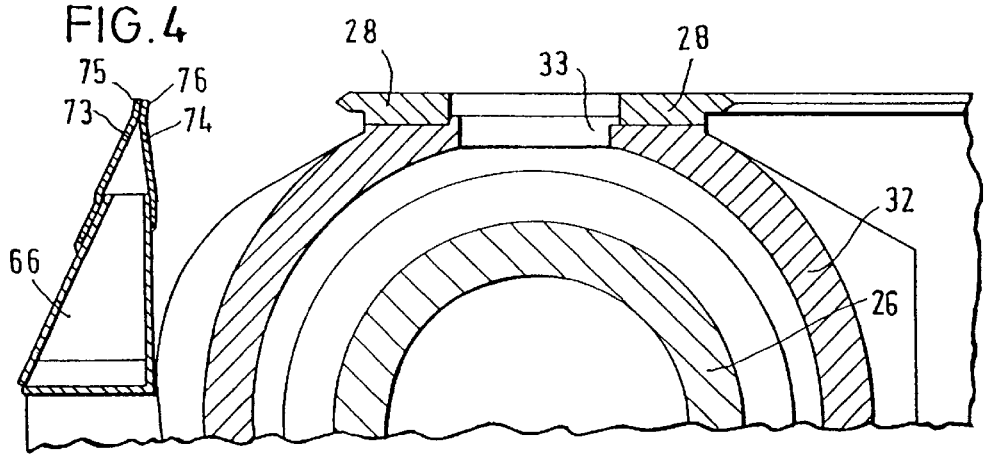
FIG. 4 is a view in section taken along line IV—IV in FIG. 1.

Looking now more specifically at FIGS. 3 and 4, provided at least in the region of each of the two linear portions 19, 20 of the transport path 18 are first and second guide rails 28 which are disposed at a horizontal spacing from each other and which are of a V-shaped cross-section. Mounted on the article carrier 12 at the underside thereof are respective guide rollers 30 which, at their peripheral surface, have a peripherally extending groove of V-shaped configuration, which is adapted to the cross-sectional shape of the respective guide rails 28. The guide rollers are arranged in pairs in such a way that a respective pair of guide rollers 30 co-operates with one of the two guide rails 28, as can also be clearly seen from FIG. 5.

The portions of the guide rails 28 which respectively extend between the two arcuate portions 22 and 23 of the transport path 18 are each carried by a housing as indicated at 32 in FIGS. 3 and 4, which accommodates the transport screw 26 operatively associated with the respective portion 19 and 20 of the transport path 18. At its top side, in the region between the two guide rails 28, the housing 32 has an open slot 33 extending over the entire length of the transport screw 26.

In the region of the transport wheels 24 and 25, that is to say in the arcuate portions 22 and 23 of the transport path 18, the guide rails 28 are carried by particular holding arrangements which are not shown in the drawing. At any event the guide rails 28 form a continuous endless transport path 18, along which the respective article carriers 12 circulate.

In addition, and looking still at FIG. 3, in the region between the two pairs of guide rollers 30, the article carrier 12 illustrated is provided with two pairs of support rollers as indicated at 34, the rollers 34 each being rotatable about a substantially horizontal axis. The support rollers 34 run on support surfaces indicated at 40 in FIG. 3, which are formed by the upper boundary surfaces of the respective guide rails 28.

Figure 5:
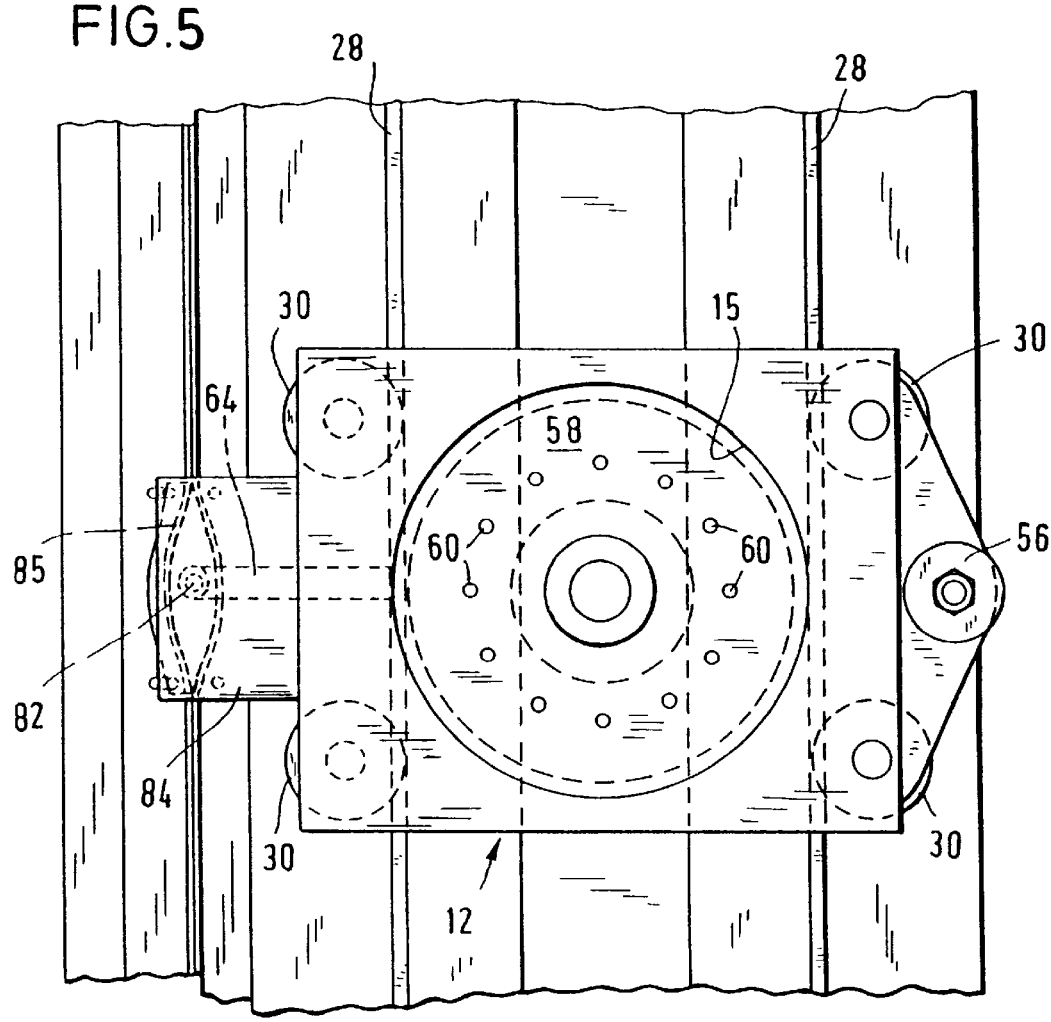
FIG. 5 is a plan view looking approximately in the direction of the arrow V in FIG. 3.
Figure 6:
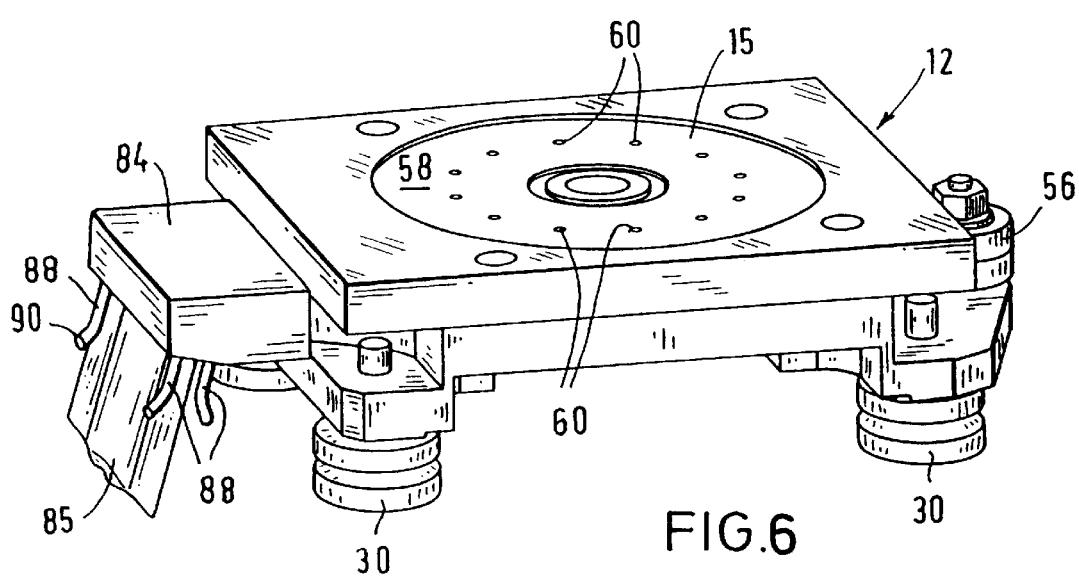
FIG. 6 is a perspective view of a holder for an article.
Figure 7:
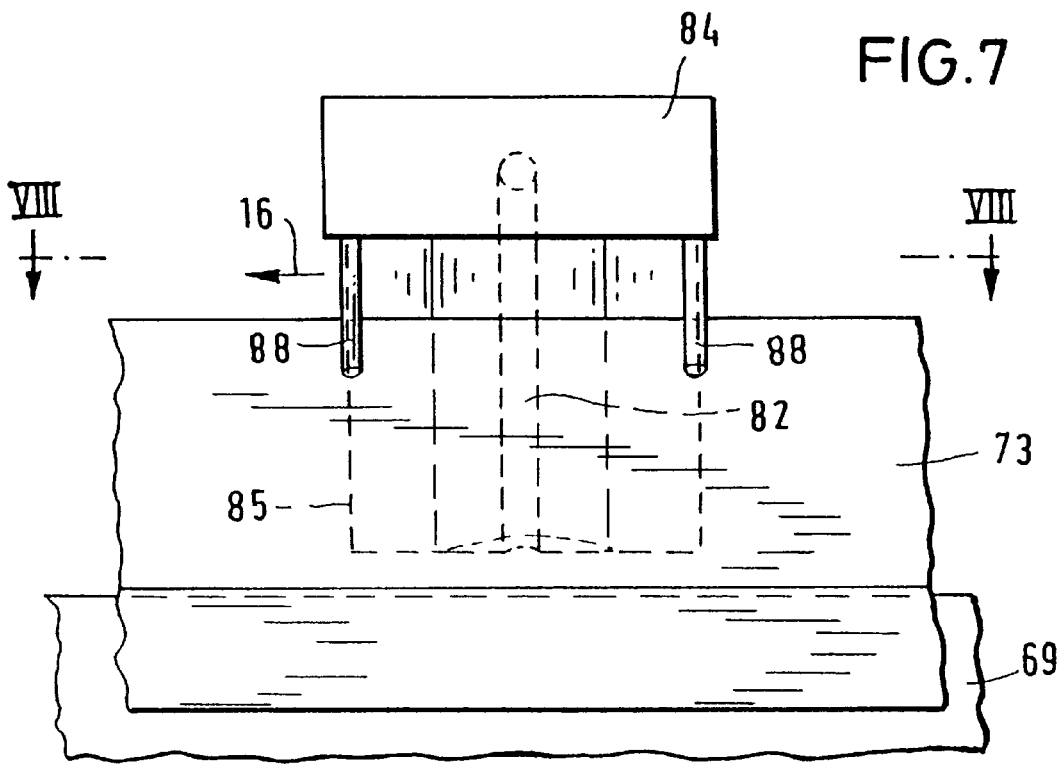
FIG. 7 is a view looking approximately in the direction of the arrow VII in FIG. 3.

At its inward side, with respect to the endless transport path 18, each article carrier 12 is provided with an upper entrainment roller which is indicated at 56 in FIGS. 5 and 6 and which is rotatable about a vertical axis. The respective article carrier 12 is entrained by way of the entrainment roller 56, in the curved portions 22 and 23 of the transport path 18. For that purpose, at their peripheral surface, each of the two transport wheels 24 and 25 are provided with recesses, into which the respective entrainment roller 56 of an article carrier engages so that the article carrier is entrained by the continuously or discontinuously rotating transport wheel 24 or 25 respectively. These entrainment configurations on the respective transport wheels are not shown in the drawing as they are not directly related to the present invention, but it will be appreciated that they can be readily provided on the transport wheels on the basis of routine knowledge in the art.

Figure 2:
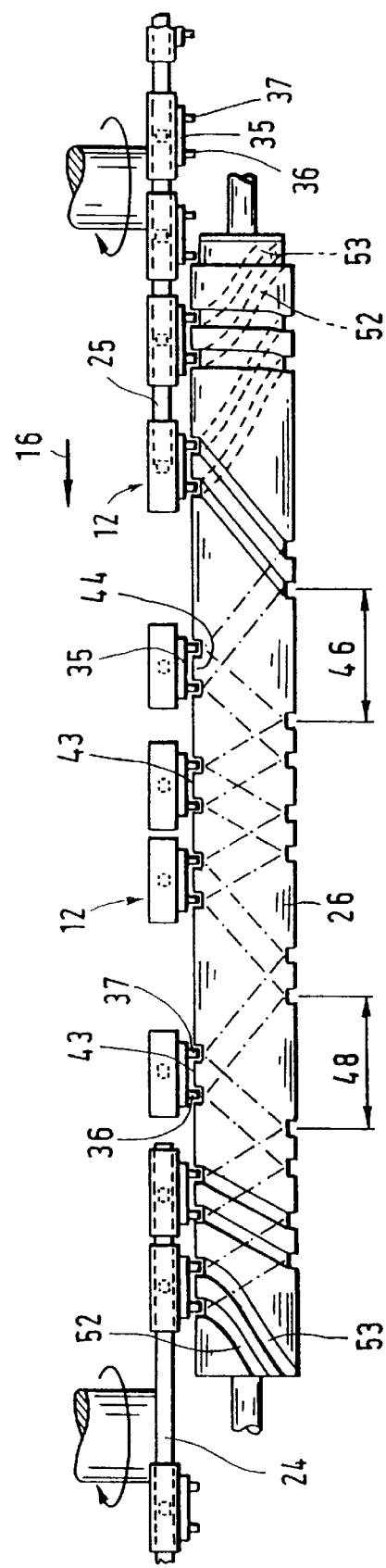
FIG. 2 is a view of a portion of the transport path of the FIG. 1 apparatus looking approximately in the direction of the arrows II—II in FIG. 1, but with the housing of the transport screw of the apparatus omitted.

Continuing to refer to FIG. 3, at its underside each article carrier 12 is provided with a projection 35 on which are mounted first and second entrainment rollers 36, 37 (shown in FIG. 2), each of which is rotatable about a vertical axis and which engage in the region of the linear portions 19 and 20 of the transport path 18 into grooves indicated in FIG. 2 at 52 and 53 in the transport screw 26 shown therein. FIG. 2 more specifically shows that the grooves 52 and 53 which extend around the screw 26 at a spacing from each other and in at least substantially parallel relationship over the major part of the length of the respective screw define a screw flight as indicated at 44 which is arranged to engage into a region indicated at 43 in FIG. 2 between the two entrainment rollers 36 and 37 of a respective pair, and thus engages behind the entrainment roller 36 which leads in the direction of transportation movement indicated by the arrow 16, with the result that, in the longitudinal portions of the transport screw 26 in which the screw flight 44 does not have a portion extending precisely perpendicularly to the longitudinal axis of the transport screw 26, a rotary movement of the transport screw 26 about its longitudinal axis produces displacement of the respective article carrier 12 along the respective linear portion 19 or 20 of the transport path 18. It will be clearly seen from FIG. 2 that the pitch angle of the screw flight 44 in the transport screw is varied along the length thereof.

By virtue of suitable dimensioning of the spacing between the two entrainment rollers 36 and 37, and the width of the screw flight 44, it is thus possible to produce a movement of the article carrier 12, with a level of accuracy which goes far beyond the level of accuracy of known machines for decorating articles.

The speed at which the article carrier 12 is transported along the respective linear portion 19 or 20 is dependent only on the pitch angle of the screw flight 44, when the transport screw 26 rotates at a constant speed. Reference will be made to FIG. 2 showing that the screw flight of the transport screw 26 is of varying pitches over the lengthwise extent of the screw 26 so that for example in the regions 46 and 48 in which the screw flight 44 is of the same respective pitch, a printing operation can be effected by means of offset printing, in which the constant speed at which the respective article carrier 12 is advanced by the transport screw 24 in those regions depends on the peripheral speed of the impression cylinder of the respective printing mechanism. In the respective stations which follow in the transport direction 16 and in which the pitch angle of the screw flight 44 is so selected that transportation of the article carrier 12 takes place at a slower speed, a respective drying apparatus can then be provided there. It will be appreciated that it is also possible to carry out a treatment on the article such as a CD, when the article carrier carrying that article is stationary. For that purpose, as already mentioned, it is only necessary for a portion of the screw flight 44 not to have an inclined pitch angle.

At the end of the transport screw 26 associated with the transport wheel 25, in the linear portion 20, that is to say at the downstream end of the linear portion 20 of the transport path 18, the article carrier 12 is transferred in terms of transportation movement thereof from the transport screw 26 operatively associated with the linear portion 20, to the transport wheel 25. At the end of the screw 26, the pitch of the screw flight 44 is to be so selected that the linear speed of the article carrier 12 corresponds to the peripheral speed of the entrainment recesses (not shown) on the transport wheel 25. In the transition of the drive from the transport wheel 25 to the transport screw 26 which is towards the linear portion 19 of the transport path 18, a corresponding procedure applies, as also in the case of the two transitions between the linear portions 19, 20 of the transport path 18 and the transport wheel 24. Moreover, guidance of the article carriers 12 at the transitions between the linear portions 19, 20 of the transport path 18 and the curved portions 22, 23 thereof does not require any special measures to be taken as the above-described guide rails 28 extend continuously over the entire transport path and therefore, at the above-mentioned transitions, there is only a change in respect of the drive means for the respective article carriers. In that respect, attention is directed to German patent application No 197 45 313.9-27 with corresonding U.S. patent Ser. No. 09/153,400, the disclosure of which is hereby incorporated into the present specification by virtue of reference thereto.

The apparatus further has at least one treatment station between an entry station at which an article to be decorated is received by a respective article carrier and a discharge station at which the decorated article is removed from its article carrier. The one or more treatment stations which are not shown in the drawing for the sake of clarity thereof are arranged along the transport path 18, in particular along the linear portions 19, 20 thereof, more specifically desirably in such a way that the treatment stations, for example an offset printing station, which require a particular degree of precision in terms of orientation of the article with respect to the treatment station, are associated with the linear portions 19, 20 in which transportation of the respective articles is effected with a high degree of precision by the respective transport screw 26, whereas those treatment stations which do not require a high level of precision and which in particular also do not result in the article and therewith the article carrier 12 carrying same being subjected to the loading of heavy forces can be at least partially associated with the arcuate portions 22 and 23 of the transport path.

Figure 11:
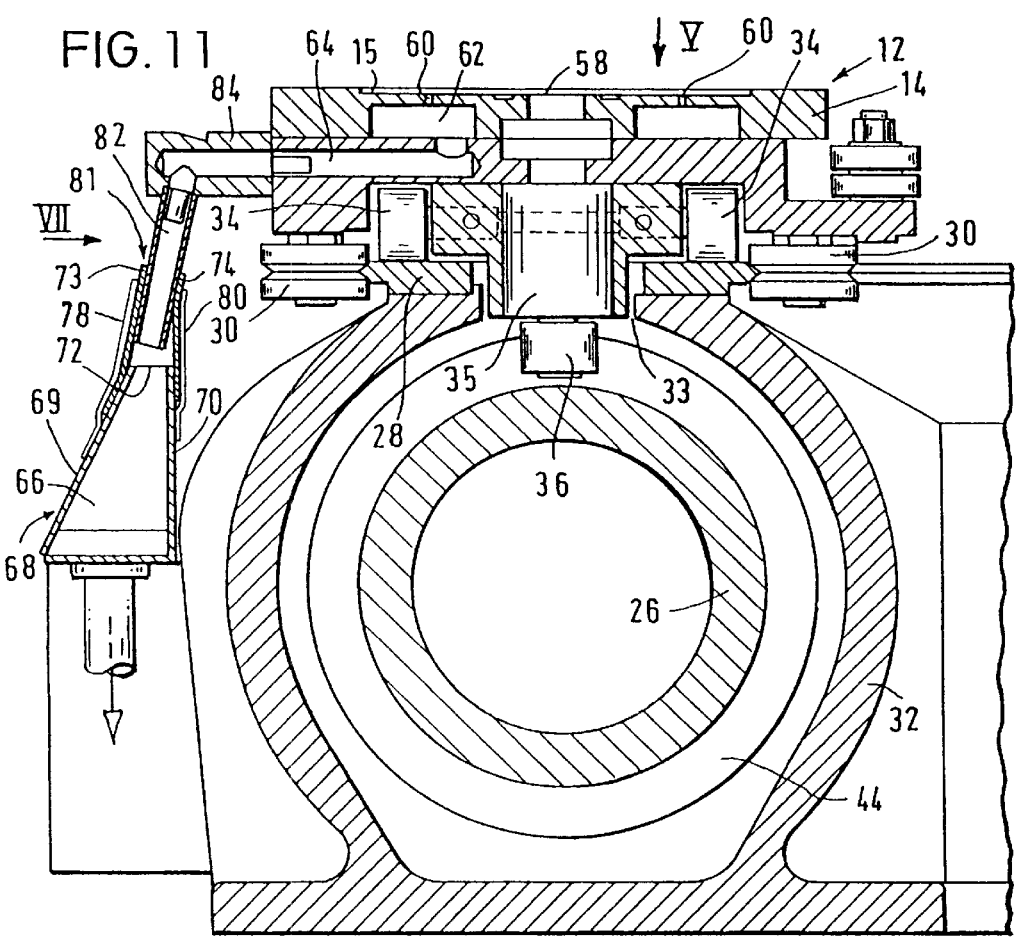
FIG. 11 is a view in section taken along line III—III in FIG. 1, showing an alternate embodiment.
Figure 12:
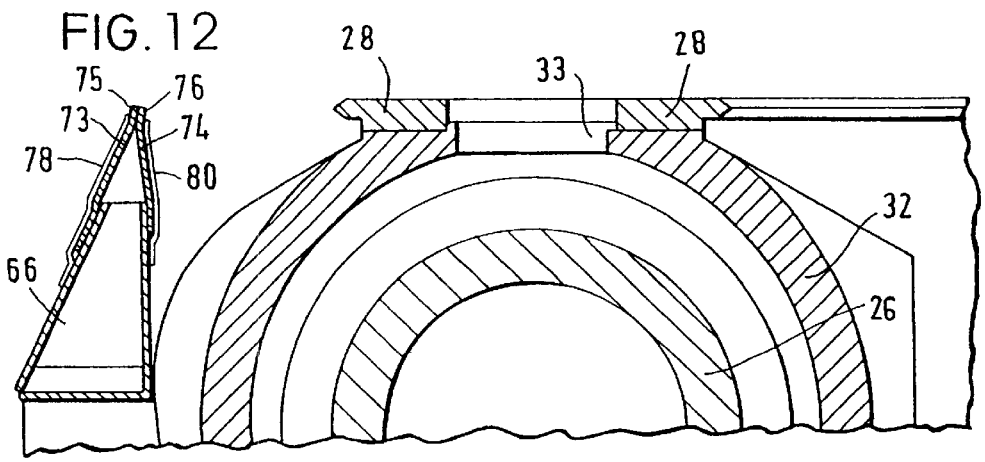
FIG. 12 is a view in section taken along line IV—IV FIG. 1, showing an alternate embodiment.

The receiving means 15 of each article carrier 12 is provided in its bottom as indicated at 58 in FIGS. 3, 5 and 6 with bores indicated at 60 in those Figures, the bores 60 being connected to a conduit and distributor system 62, 64 disposed within the article carrier 12. A vacuum is caused to act by way of the bores 60 on the underside of an article such as a CD which is disposed in the receiving means 15, that vacuum serving to hold the CD in its required position in the receiving means 15. To achieve that, the apparatus further includes a vacuum duct indicated at 66 in FIGS. 3 and 4 which extends substantially parallel to the transport path 18 and which can comprise a channel-shaped hollow profile member 68 which is open at its upper boundary edge 72. The profile member 68 has two side walls 69 and 70 which, at their edge region towards an opening 72 in FIG. 3 at the upper edge of the profile member 68, are provided with strip portions 73, 74 of a resiliently flexible material such as a rubber material which are suitably sealingly connected to the side walls 69 and 70 of the profile member 68 and which project upwardly beyond the opening 72 and which can be biased in such a way that, as shown in FIG. 4, they bear against each other at their edge regions 75, 76 which are remote from the opening 72, everywhere along the longitudinal extent of the vacuum duct 66, where there are no opposing forces acting on the strip portions 73 and 74. In that way the strip portions 73 and 74 in their condition of bearing against each other also close off the vacuum duct 66 at its upper edge. FIGS. 3 and 4 show that the two side walls 69 and 70 of the profile member 68 are arranged in such a way that the spacing between them decreases in an upward direction, with the consequence that the edge regions of the two strip portions 73 and 74 of resilient material come to bear against each other in any case, that is to say without involving a particular prestressing effect in respect thereof, at a short distance above the opening 72. The two edge regions 75 and 76, which bear against each other, of the two strip portions 73 and 74 are also additionally pressed against each other by the atmospheric pressure which obtains outside the vacuum duct 66 and which is therefore higher than the pressure in the vacuum duct 66. In addition, as shown in FIGS. 11 and 12, at least one of the two strip portions 73 and 74 may also be provided on its outside with a support portion as indicated at 78 and 80 respectively which is also in strip form and which preferably extends along the entire length of the vacuum duct 66. The one or both support strip portions 78, 80 may comprise for example flexible plastic material and can also be prestressed in a direction towards the respective other sealing strip portion 73 and 74.

The connection between the conduit system 62, 64 within the respective article carrier 12 and the vacuum duct 66 which extends along the transport path 18 is made by way of a connecting conduit indicated at 82 in FIGS. 3 and 5 which is fixedly mounted to the article carrier 12. The connecting conduit 82 extends from a projection 84 which is provided on the article carrier 12 on the outward side thereof, with respect to the endless transport path 18 along which the article carrier 12 moves. The connecting conduit 82 is provided with a sliding shoe 85 which extends from the projection 84 towards the vacuum duct 66 arranged thereneath on the housing 32, in such a way that the sliding shoe 85 can engage between the two sealing strip portions 73 and 74 of the vacuum duct 66, and the edge regions 75 and 76 thereof which normally bear against each other as shown in FIG. 4 are urged apart to form an aperture as indicated at 81 in FIG. 3 in order thereby to form a communication between the interior of the vacuum duct 66 and the connecting conduit 82. In that way, the vacuum also takes effect in the bores 60 in the bottom of the receiving means 15, by way of the conduit and distributor system 62 and 64 provided within the article carrier 12. As the CD which is lying in the receiving means 14, or another flat object carried therein, substantially covers over the bores 60 so that it is not possible for a pressure equalisation effect to occur by way of the bores 60, the CD in the receiving means 15 is fixed in respect of its position therein by the atmospheric air pressure which presses the CD against the bottom 58 of the receiving means 15, insofar as the atmospheric pressure is somewhat higher than the vacuum or reduced pressure obtaining in the vacuum duct 66 and thus transmitted by way of the aperture 81 and the connecting conduit 82 to the underside of the CD in the receiving means 15. The level of the reduced pressure to be applied also depends on the size of the article in the receiving means 15, as the force with which the article is pressed against the bottom 58 of the receiving means 15 represents a product of surface area and pressure difference. In the case of a CD, a slight reduced pressure of the order of magnitude of 0.2 bar is sufficient so that the inevitable leaks in the system overall have only a slight effect on the reduced pressure which is to be maintained in the duct 66.

Figure 8:
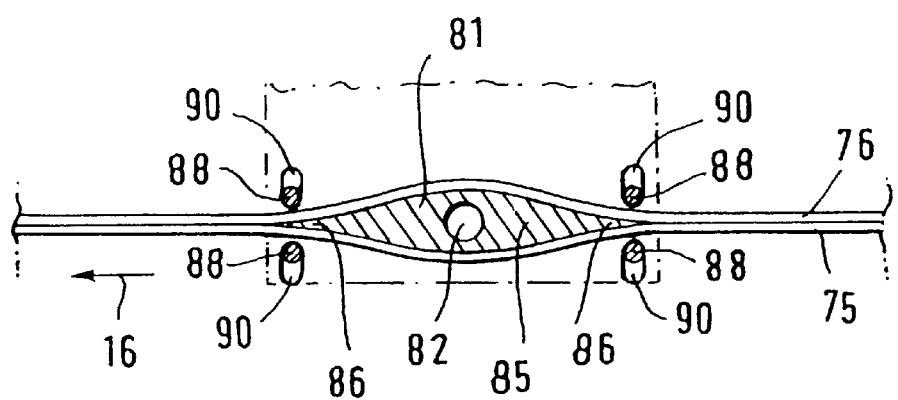
FIG. 8 is a view in section taken along line VIII—VIII in FIG. 7.

Reference will now be made more particularly to FIGS. 5 through 8 showing that the sliding shoe 85, in longitudinal section substantially in a plane extending perpendicularly to the longitudinal direction of the connecting conduit 82, is of a configuration similar to that of a weaving loom shuttle, being essentially boat-shaped with pointed ends, so that the two strip portions 73, 74 and more especially the edge regions 75 and 76 thereof bear snugly against the sides of the sliding shoe 85 and sealingly embrace the sliding shoe 85, as can be particularly clearly seen from the condition illustrated in FIG. 8. In order to prevent the two edge regions 75, 76 from spreading open and thus to avoid the occurrence of major leakage, more especially in the region of the two pointed or tapering ends 86 which are the leading and trailing ends of the sliding shoe 85 in the transport direction 16, a respective guide pin 88 is operatively associated with the sliding shoe 85 at each side thereof in each of the two end regions thereof. As can be seen for example from FIG. 7, each guide pin is mounted to the projection 84 and extends substantially parallel to the connecting conduit 82 and approximately perpendicularly to the transport direction 16, in a direction towards the vacuum duct 66. In that respect however the arrangement is such that when the sliding shoe 85 is disposed within the vacuum duct 66, the pins 88 are outside the vacuum duct 66, for which purpose the spacing between a pin 88 and the respective oppositely disposed wall region of the sliding shoe 85 approximately corresponds to the thickness of the edge region 75, 76 of the respective sealing strip portion 73 and 74. That arrangement and positioning thus provides that, at the two end regions 86 of the sliding shoe 85, the two edge regions 75 and 76 of the vacuum duct 66 are additionally pressed against the sliding shoe 85 by virtue of the proximity and the action of the pins 88, in order thereby to prevent the occurrence of a gap between the two sealing strip portions 73 and 74 of the vacuum duct 66, at positions adjoining the ends of the sliding shoe 85. So that, when the sliding shoe 85 with the connecting conduit 82 is introduced into the region of the vacuum duct 66 between the two sealing strip portions 73 and 74, the operation of relatively inserting the sealing strip portions 73 and 74 between the sides of the sliding shoe 85 and the two guide pins 88 which are disposed at each respective side thereof is facilitated, each of the guide pins 88 is bent or curved somewhat outwardly at its free end, as indicated at 90 in FIGS. 6 and 8.

It will be seen from FIG. 1 that the vacuum duct 66 is of an endless configuration, similarly to the transport path 18 for the article carriers 12. Each of the numerous article carriers of the apparatus can be of the design configuration described hereinbefore with reference to FIGS. 3 through 8 so that access to the vacuum duct 66 is implemented by way of the sliding shoe 85 and the connecting conduit 82 thereof, at a correspondingly large number of locations along the vacuum duct. In that respect, it is immaterial whether an article carrier is stationary for a given period of time, that is to say, it is not implementing a transportation movement. That can be for example the case in the station diagrammatically indicated at P in which the articles to be decorated or printed upon are supplied to the respective article carrier 12 disposed at that station for receiving same. A corresponding consideration also applies to the discharge or removal station indicated at S in FIG. 1, at which the decorated or printed articles are removed from the respective article carrier 12 so that the article carriers 12 are moved in an empty condition between the two stations S and P. In that respect however, in spite of the absence of any article in the respective receiving means 15 of those article carriers, there is no need to shut down the vacuum as the bores 60 in the individual article carriers 12 are of a very small diameter so that the resulting flow resistance prevents pressure equalisation in respect thereof, especially as the number of article carriers which are actually empty between the stations S and P is small.

The design configuration in accordance with the invention of the vacuum duct 66 and the communication between same and the conduits in the article carriers 12 has at any event the advantage of great simplicity as the connecting conduit 82 and the sliding shoe thereof afford access to the vacuum duct 66 by virtue of the two sealing strip portions 73 and 74 thereof being simply urged apart in the region of the sliding shoe 85. In that respect, it is also immaterial whether the article carrier 12 and therewith the sliding shoe 85 moves along the transport path 18 and the vacuum duct 66 respectively at a higher or lower speed or is possibly also stationary. The fact that the article carriers 12 can move at varying speeds and thus can be at varying spacings from each other is irrelevant as the apparatus configuration and structure in accordance with the invention allows a high degree of flexibility in this respect. The access to the vacuum duct 66, which is afforded by the aperture 81, is automatically implemented by the respective sliding shoe 85 at any location along the vacuum duct 66 and is displaced along the vacuum duct 66, in accordance with the transportation movement of the article carrier 12 along the transport path 18. It is merely to be noted that the sliding shoes 85 are shorter in the direction of movement of the article carriers 12, than the article carriers 12 themselves, so that a sufficient spacing always remains between two adjacent article carriers 12 and the sliding shoes 85 thereof, whereby the vacuum duct 66 is always closed between two adjacent sliding shoes 85, even when in their most closely adjacent positions.

Reference will now be made to FIGS. 9 and 10 showing views of parts of a second embodiment of the apparatus in accordance with the invention, which is the same in terms of the essential components thereof as the embodiment described hereinbefore with reference to FIGS. 1 through 8, so that the same components are also denoted by the same references but increased in each case by 100 in the case of the embodiment shown in FIGS. 9 and 10.

In consideration of the similarity between the embodiment shown in FIGS. 1 through 8 and the embodiment shown in FIGS. 9 and 10 the latter embodiment will not be described in full detail again at this point but reference will be directed to the corresponding description of the first embodiment for incorporation thereof at this point.

The only major difference between the two embodiments concerns the configuration of the vacuum duct which was identified by reference numeral 66 in FIGS. 1 through 8 and the connecting conduit identified by reference numeral 82 in that embodiment. Now, in the embodiment shown in FIGS. 9 and 10, the vacuum duct indicated at 166 is also open at one side so that it can be formed by a hollow profile member which however is closed at the open side thereof by a cover means 192 in strip form, which is constituted by a toothed belt. The strip 192 or toothed belt has a central longitudinally extending region 193 which thus covers the opening 172 in the vacuum duct 166, and bears against the end faces of the two substantially parallel walls 191, 198 defining the vacuum duct. In the region of the linear portions 119, 120 of the transport path, it slides against those end faces. At both sides of the central, longitudinally extending region 193, the toothed belt 192 is provided with teeth indicated at 194 in FIG. 10, which are in engagement with suitable gears or toothed pulleys which are mounted on or suitably connected to the two rotating transport wheels which are indicated at 24 and 25 in FIG. 1.

The embodiment of FIGS. 9 and 10 also provides that the vacuum duct 166 is in the form of an endless duct which extends substantially parallel to the transport path along which the article carriers 112 move. That means that the portions of the hollow profile member constituting the vacuum duct 166, which extend along the linear portions 119 and 120 of the transport path, are continued by and communicate with a vacuum duct portion which is disposed at each of the two transport wheels 24, 25 of FIG. 1 and rotates with same. In that case, where the two linear stationary portions of the vacuum duct 116 adjoin the rotating vacuum duct portion arranged at the respective transport wheel, there is provided a barrier or closure means in the form of a stationary sealing shoe which engages into the vacuum duct portion on the transport wheel and separates that vacuum duct portion which is covered by the toothed belt 192 and is thus closed, from the vacuum duct portion which is not covered, in order thereby to prevent pressure equalisation between the vacuum duct and the ambient atmosphere occurring at those transitional regions. If the two linear transport path portions extend parallel to each other and the two transport wheels indicated at 24 and 25 in FIG. 1 are thus of the same diameter, each of the vacuum duct portions carried on the transport wheels is covered by the toothed belt over a region of 180°, while the two mutually facing regions, each of 180°, on the two transport wheels, are uncovered.

The communication between the conduit and distributor system for the vacuum in the respective article carrier 112 on the one hand and the peripherally extending vacuum duct 116 on the other hand is made by way of a flexible conduit or hose portion 182 connected by way of an intermediate tube 195 to a conduit 196 in a a connecting block 197 which is fixedly mounted to the toothed belt 192 on the outward side thereof, that is to say on the side which is remote from the inwardly facing teeth 194. At the location at which the conduit 196 in the connecting block 197 meets the toothed belt 192, the latter is provided with a through aperture 181 by way of which the communication is made between the interior of the vacuum duct 166 and the connecting conduit 182.

As the toothed belt 192 is driven by the two transport wheels 24 and 25 of FIG. 1 which rotate continuously at a uniform speed, but the article carriers 112 can move with a varying speed in dependence on the pitch of the screwflight 144 of the transport screw, in the linear portions 119 and 120 of the transport path, it is possible for the article carrier 112 on the one hand and the associated connecting block 197 on the other hand to be moving at different transport speeds at least over parts of the transport path, so that they alter their relative positions. That is compensated by the flexible connecting line indicated at 182, whose minimum length accordingly must correspond to the maximum possible distance in the transport direction 116 between the article carrier 112 and the associated connecting block 197.

Operatively associated with the toothed belt 192 are first and second angle members 199 which, at least along the linear transport path portions 119 and 120, engage in the manner shown more particularly in FIG. 10 behind the edge regions of the toothed belt 192 and provide an additional guidance effect for same. As the toothed belt 192 is under a tension acting in the longitudinal direction thereof, there is no need for special measures for pressing the toothed belt 192 against the profile member defining the vacuum duct 166.

An important difference between the embodiment illustrated in FIGS. 1 through 8 and the embodiment illustrated in FIGS. 9 and 10 is thus that, in the embodiment of FIGS. 1 through 8, the aperture 81 which allows access to the vacuum duct 66 is produced by the preferably rigid connecting conduit 82 or the sliding shoe 85 which is formed thereby or with which it is provided, and is moved along the generally stationary strip portions 73, 74 as a consequence of the transportation movement of the respective article carrier 12, whereas in the embodiment of FIGS. 9 and 10, the aperture 181 is disposed on a moving closure for the vacuum duct, more specifically the toothed belt, and is thus moved therewith.

It will be noted that, although the foregoing description referred just to CDs as the articles to be decorated by the apparatus of the invention, application of the invention is in no way limited to articles of that nature. On the contrary the invention can be used wherever any articles to be decorated are to be subjected to the effect of vacuum for holding them in the appropriate position.

It will be further appreciated that the above-described apparatuses for decorating articles in accordance with the invention have been set forth solely by way of example and illustration of the principles thereof and that various other modifications and alterations may be made therein without thereby departing from the spirit and scope of the invention.

What is claimed is:

1. Apparatus for decorating an article, comprising means providing a transport path for the article to move therealong, at least one article carrier for carrying the article, movable along the transport path, a reception station at which the article is received by the article carrier, a discharge station at which the decorated article is removed from the article carrier, a treatment station disposed along the transport path between the reception and discharge stations and operable to apply decoration to the article, a vacuum source, and means connecting the article carrier to the vacuum source at least over a portion of the transport path, said connecting means including a stationary vacuum duct along said portion of the transport path, the vacuum duct having a channel extending along its longitudinal extent and having a first side at which it is open, and at least one wall portion of elastically deformable material extending in the longitudinal direction of the vacuum duct and adapted to close said channel at said first side thereof, at least one vacuum conduit in the article carrier, a connecting conduit connected to the vacuum conduit in the article carrier and connected to the stationary vacuum duct movably along the transport path, the vacuum duct being provided with an aperture for the vacuum to pass therethrough to said connecting conduit, wherein the aperture is movable along the vacuum duct.

2. Apparatus as set forth in claim 1 wherein the vacuum duct is delimited at the open side of the channel by first and second wall portions which extend along the edges of the vacuum duct and of which at least one is elastically deformable and is urged in a direction towards the respective other wall portion, and the wall portions bear against each other when access to the vacuum duct is closed, and wherein the connecting conduit has an end remote from the article carrier and engaging between the wall portions to urge them apart to provide an aperture for the vacuum in the region of the end of the connecting conduit.

3. Apparatus as set forth in claim 2 wherein the wall portions include an acute angle in the cross-section of the vacuum duct.

4. Apparatus as set forth in claim 2 wherein the connecting conduit has an end portion in operative engagement with the vacuum duct and at said end portion the connecting conduit which at least partially consists of solid material provides a sliding shoe which, in section parallel to the longitudinal extent of the vacuum duct, is of a narrow cross-section which converges in a pointed configuration at front and rear in the direction of movement and which engages between the wall portions of the vacuum duct.

5. Apparatus as set forth in claim 4 wherein said end portion of the connecting conduit is in the form of the sliding shoe.

6. Apparatus as set forth in claim 4 wherein said sliding shoe is formed by a member fitted on said end portion of the connecting conduit.

7. Apparatus as set forth in claim 4 wherein the connecting conduit is in its entirety in the form of a rigid sliding shoe which extending from the article carrier engages between the wall portions of the vacuum duct.

8. Apparatus as set forth in claim 4 wherein the region of the connecting conduit which co-operates with the wall portions is provided with guide means which engage on the outside behind the at least one elastic wall portion and displace same in a direction towards the position thereof for closing the vacuum duct.

9. Apparatus as set forth in claim 1 wherein the vacuum duct is of a cross-section which is tapering in a direction towards the aperture for the connecting conduit.

10. Apparatus as set forth in claim 1 including at the open side of the channel of the vacuum duct an endless cover means in the form of a strip and provided with at least one aperture to which the at least one connecting conduit for the article carriers is connected and means for moving the cover means strip substantially parallel to the transport path for the article carrier in the transport direction thereof with respect to the vacuum duct.

11. Apparatus as set forth in claim 10 wherein the at least one connecting conduit comprises flexible material and is of a length which permits changes in the relative position between an article carrier and an associated aperture in the cover means.

12. Apparatus as set forth in claim 10 wherein the strip closing the channel is in the form of an endless toothed belt having a longitudinally extending region which bearing in sliding relationship against the channel closes the vacuum duct therein, and rows of teeth on respective sides of the longitudinally extending region.

13. Apparatus as set forth in claim 12 including at least one rotatable transport wheel driving the toothed belt, the wheel also being operable for transportation of the article carrier at least over a part of the transport path.

14. Apparatus as set forth in claim 12 wherein the vacuum duct is adapted in operation to have a pressure therein of not more than 0.3 bar below the ambient atmospheric pressure.

15. Apparatus as set forth in claim 1 including a guide means for the at least one article carrier, wherein the vacuum duct is arranged below the guide means.

* * * * *